United States Patent
Prasad et al.

(10) Patent No.: US 10,073,683 B2
(45) Date of Patent: Sep. 11, 2018

(54) SYSTEM AND METHOD FOR PROVIDING SOFTWARE BUILD VIOLATION DETECTION AND SELF-HEALING

(71) Applicant: ORACLE INTERNATIONAL CORPORATION, Redwood Shores, CA (US)

(72) Inventors: Kyasaram Vishwa Prasad, Hyderabad (IN); Anilkumar Gande, Hyderabad (IN); Srikanth Subrahmanya Nandula, San Jose, CA (US); Subhadarshi Mishra, Sam Ramon, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 63 days.

(21) Appl. No.: 14/841,827

(22) Filed: Sep. 1, 2015

(65) Prior Publication Data

US 2017/0060546 A1  Mar. 2, 2017

(51) Int. Cl.
| | |
|---|---|
| *G06F 9/44* | (2018.01) |
| *G06F 9/45* | (2006.01) |
| *G06F 8/41* | (2018.01) |
| *G06F 11/34* | (2006.01) |
| *G06N 5/04* | (2006.01) |
| *G06F 11/00* | (2006.01) |

(52) U.S. Cl.
CPC ............ *G06F 8/41* (2013.01); *G06F 11/3476* (2013.01); *G06N 5/047* (2013.01); *G06F 11/00* (2013.01)

(58) Field of Classification Search
CPC . G06F 8/20–8/41; G06F 11/3476; G06F 8/65; G06F 11/004; G06F 11/00; G06N 5/047
See application file for complete search history.

(56) References Cited

U.S. PATENT DOCUMENTS

| | | | |
|---|---|---|---|
| 5,956,513 A | 9/1999 | McLain, Jr. | |
| 6,345,322 B1 | 2/2002 | Humphrey | |
| 6,591,413 B1 | 7/2003 | Humphrey et al. | |
| 7,100,083 B2* | 8/2006 | Little | G06F 11/2257 |
| | | | 706/47 |

(Continued)

FOREIGN PATENT DOCUMENTS

CN  101515232 A  8/2009

OTHER PUBLICATIONS

Alessandra Gorla, Archieving cost-effective software reliability through self-healing, University of Lugano, Switzerland, Computing and Informatics, vol. 29, 2010, p. 93-115.*

(Continued)

*Primary Examiner* — Mongbao Nguyen
(74) *Attorney, Agent, or Firm* — Cooper Legal Group, LLC (57) ABSTRACT

Systems and methods, are provided for self-healing solutions to problems that occur during a software build. In one embodiment, build log data structures of build data, generated during execution of a software build of a software application, are automatically monitored. The build data is automatically analyzed to detect patterns that can result in build violations. Detected patterns are automatically matched to remediation solutions stored in a knowledge database. The remediation solutions are automatically applied to the software application.

20 Claims, 5 Drawing Sheets

(56) References Cited

U.S. PATENT DOCUMENTS

| | | | |
|---|---|---|---|
| 7,788,536 B1* | 8/2010 | Qureshi | G06N 5/048 |
| | | | 714/26 |
| 7,962,798 B2* | 6/2011 | Locasto | G06F 11/1438 |
| | | | 714/38.1 |
| 8,209,687 B2* | 6/2012 | Yuyitung | G06Q 10/06 |
| | | | 718/1 |
| 8,499,280 B2 | 7/2013 | Davies et al. | |
| 8,793,670 B2* | 7/2014 | Lagergren | G06F 8/443 |
| | | | 717/146 |
| 8,856,724 B2* | 10/2014 | Somani | G06F 8/30 |
| | | | 717/101 |
| 8,898,676 B2* | 11/2014 | Hiltgen | G06F 8/60 |
| | | | 717/100 |
| 9,158,922 B2* | 10/2015 | Liu | G06F 21/577 |
| 9,286,035 B2* | 3/2016 | Sundararam | G06F 8/30 |
| 9,304,827 B2* | 4/2016 | Werth | G06F 9/4446 |
| 9,317,695 B2* | 4/2016 | Pappas | G06F 21/577 |
| 9,378,008 B2* | 6/2016 | Druch | G06F 8/67 |
| 9,378,014 B2* | 6/2016 | Wilson | G06F 8/43 |
| 9,477,461 B1* | 10/2016 | Korotaev | G06F 8/67 |
| 9,569,185 B2* | 2/2017 | Wuerthinger | |
| 9,594,549 B2* | 3/2017 | Hey | G06F 8/65 |
| 2004/0103406 A1* | 5/2004 | Patel | G06F 8/41 |
| | | | 717/140 |
| 2005/0155013 A1* | 7/2005 | Carrigan | G06F 8/71 |
| | | | 717/101 |
| 2008/0028371 A1* | 1/2008 | Brothers | G06F 8/73 |
| | | | 717/136 |
| 2012/0079447 A1 | 3/2012 | Arnott et al. | |
| 2012/0159463 A1* | 6/2012 | Druch | G06F 8/67 |
| | | | 717/140 |
| 2012/0260240 A1 | 10/2012 | Arnott et al. | |
| 2012/0317440 A1* | 12/2012 | Towle | G06F 11/0769 |
| | | | 714/15 |
| 2013/0007701 A1* | 1/2013 | Sundararam | G06F 8/30 |
| | | | 717/109 |
| 2013/0014107 A1* | 1/2013 | Kirchhofer | G06F 9/5083 |
| | | | 718/1 |
| 2013/0227352 A1* | 8/2013 | Kumarasamy | G06F 11/3072 |
| | | | 714/47.1 |
| 2014/0053135 A1 | 2/2014 | Bird et al. | |
| 2014/0173563 A1* | 6/2014 | Dias | G06F 8/74 |
| | | | 717/123 |
| 2014/0282459 A1* | 9/2014 | Hey | G06F 8/65 |
| | | | 717/168 |
| 2015/0033202 A1* | 1/2015 | Wilson | G06F 8/43 |
| | | | 717/106 |
| 2015/0082276 A1* | 3/2015 | Balachandran | G06F 8/30 |
| | | | 717/112 |
| 2015/0100945 A1 | 4/2015 | Nadar et al. | |
| 2016/0011866 A1* | 1/2016 | Apte | G06F 8/71 |
| | | | 717/121 |

OTHER PUBLICATIONS

Stefania Montani, Achieving self-healing in service delivery software system by means of case-based reasoning, Springer Science +Bussiness Media, LLC 2007, pp. 139-152.*

A.R. Haydarlou, A Self-Healing Approach for Object-Oriented Applications, 2005, pp. 1-5. https://research.vu.nl/ws/files/2431949/saacs05.pdf (Year: 2005).*

Tanzirul Azim, Towards Self-healing Smartphone Software via Automated Patching, 2014, pp. 1-6. http://www.cs.ucr.edu/~neamtiu/pubs/ase14azim.pdf (Year: 2014).*

Nicolo Perino, A Framework for Self-Healing Software Systems, 2013, pp. 1397-1400. https://dl.acm.org/citation.cfm?id=2487016 (Year: 2013).*

Komi S. Abotsi, A Software Product Line-Based Self-Healing Strategy for Web-Based Applications, 2011, pp. 1-8 https://dl.acm.org/citation.cfm?id=2019171 (Year: 2011).*

Seo et al., Programmers' Build Errors: A Case Study (at Google), ICSE'14, May 31-Jun. 7, 2014, pp. 724-734, Hyderabad, India, http://dl.acm.org/citation.cfm?id=2568255.

\* cited by examiner

SYSTEM AND METHOD FOR PROVIDING SOFTWARE BUILD VIOLATION DETECTION AND SELF-HEALING

BACKGROUND

Today, there is a growing demand and need for faster software release cycles. A software build of a software application can be triggered easily and automatically with continuous integration tools. However, when executing a software build, various problems can occur during the build which can cause the build to fail. Providing the intelligence associated with decision making with respect to build failures and identifying root causes of the failures has been very challenging. Complex software builds are dependent on large infrastructures for faster processing of builds. Teams across the globe may be waiting for the completion of a current build. Improvements in overall full build cycle times helps in increasing the productivity of resources and the releasing of build infrastructure to other systems. Existing automation tools for builds concentrate more on the proper reporting of build problems. It is up to individual development teams to look at issues and fix the problems for the next build cycle. Time is wasted in manually analyzing and debugging the problem, and then making the fix.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be designed as multiple elements or that multiple elements may be designed as one element. In some embodiments, an element shown as an internal component of another element may be implemented as an external component and vice versa. Furthermore, elements may not be drawn to scale.

DETAILED DESCRIPTION

Systems, methods, and other embodiments are disclosed for providing automated detection and correction of software build violations. A knowledge database of build patterns that can result in build violations is built up over time, along with associated remediation solutions. Remediation solutions are applied to a software application associated with a software build. Initially, a remediation solution may be manually applied. However, over time, as the remediation solution is successfully applied more and more, the remediation solution may be designated as "self-healing". A self-healing remediation solution is applied automatically to a software application without manual intervention from human software developers. Such a self-healing process speeds up the software build process and increases the productivity of resources and the releasing of build infrastructure to other systems. Therefore, carbon emissions emitted by the large infrastructure associated with performing software builds are effectively reduced.

In one embodiment, a knowledge database is built up over time and stores multiple build patterns that are correlated to multiple remediation solutions. The build patterns are related to build violations that have occurred during prior software builds. Monitoring logic automatically monitors build data generated during the execution of a current software build of a software application. Predictive analysis logic automatically analyzes the build data to detect build patterns that can result in build violations. Detected build patterns are automatically matched to remediation solutions stored in the knowledge database. Remediation logic automatically applies the remediation solutions to the software application without human intervention (i.e., in a self-healing manner). In some instances, a remediation solution can be applied without aborting the current software build. In other instances, the current software build is aborted, the remediation solution is applied, and a new software build is initiated, all without human intervention.

The following terms are used herein with respect to various embodiments.

The term "software application", as used herein, refers to a computer program that performs specialized functions or tasks. For example, Oracle® Primavera Portfolio Management is a software application. A software application typically includes a plurality of software modules that are integrated and compiled to run on a computing platform.

The term "software build", as used herein, refers to the process of converting and integrating blocks of source code of a software application to compiled binary code. A software build is performed by a build system.

The term "build violation" or "build problem", as used herein, refers to any of a build error, a build exception, or a software compliance violation that occurs during a software build.

The term "remediation solution", as used herein, refers to a change applied to the source code of a software application which corrects a build problem (i.e., eliminates one or more build violations).

The term "build data", as used herein, refers to data generated during a software build which is captured in build log data structures.

The term "build pattern" or "pattern", as used herein, refers to an ordering of build data that can result in a build violation.

The term "self-healing", as used herein, refers to the automatic application of a remediation solution to a software application resulting from the automatic detection of a build pattern associated with a build violation.

Figure 1:
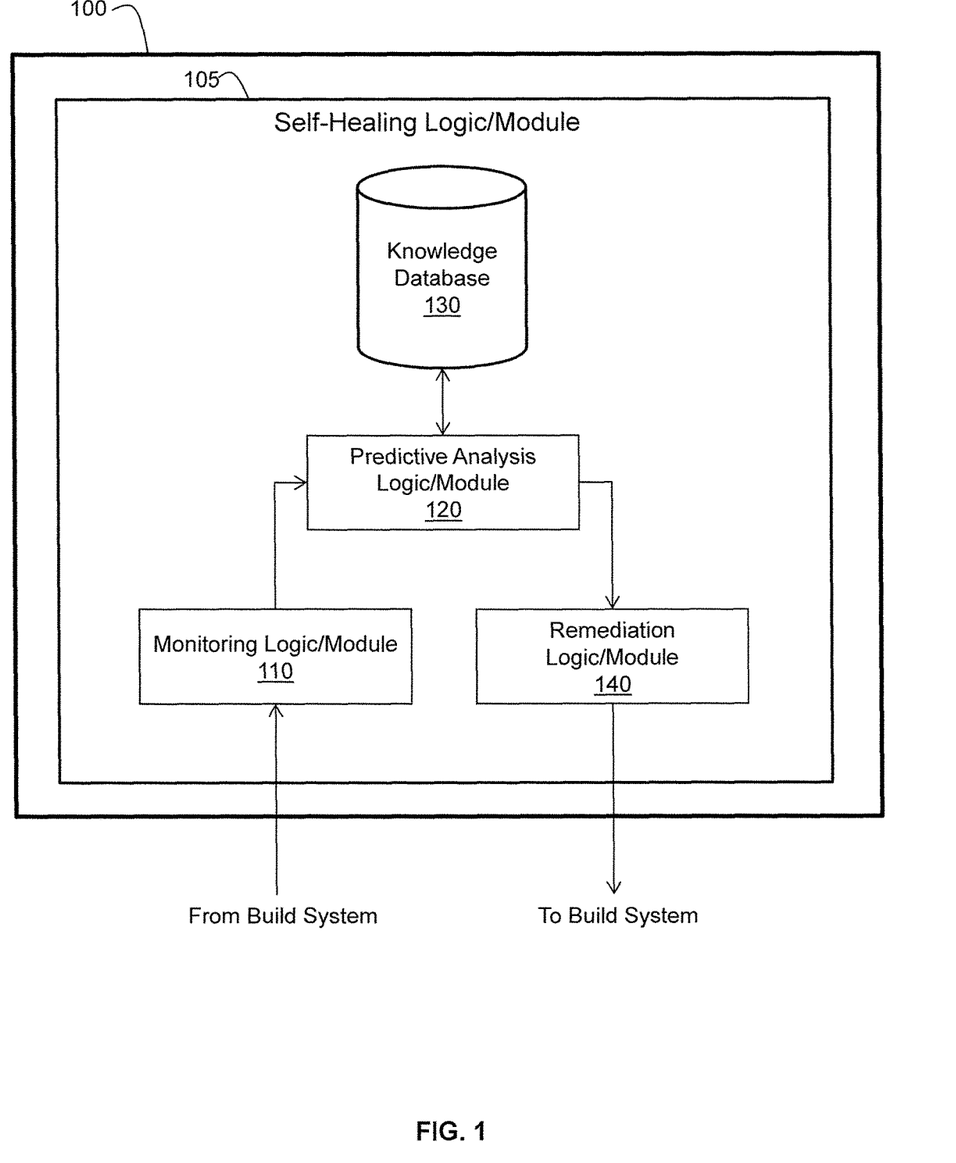
FIG. 1 illustrates one embodiment of a computing device configured with self-healing logic that provides software build violation detection and self-healing.

FIG. 1 illustrates one embodiment of a computing device 100 configured with self-healing logic 105 that provides software build violation detection and self-healing. Self-healing logic 105 is configured to computerize and automate the process of detecting and fixing build problems that occur during a software build. For example, in one embodiment, self-healing logic 105 is configured to apply "big data"

predictive analysis techniques to build data, generated by a software build, to detect patterns that have been known to result in build violations and correlate such patterns to remediation solutions.

In one embodiment, the computing device 100 is a computing/data processing system including an application or collection of distributed applications for enterprise organizations. The applications and computing device 100 may be configured to operate with or be implemented as a cloud-based networking system, a software-as-a-service (SaaS) architecture, or other type of computing solution.

The embodiments described herein provide for the fixing of software build problems in an automated manner. Build patterns from previous software builds that resulted in build violations, and associated remediation solutions, are captured and stored in a knowledge database. It is assumed herein that multiple builds of a software application occur over time and that the knowledge database builds up over time in response to the multiple builds. For example, two (2) software builds may occur every day for twelve (12) months before a software application is ready for production release. During this time, the knowledge database may grow considerably.

As a current software build executes, resulting build data is monitored and analyzed for the build patterns that are known to potentially result in build violations, based on the knowledge database. When such a build pattern is detected, a corresponding remediation solution is accessed from the knowledge database and applied to the software application being built. In one embodiment, a computer algorithm is disclosed that implements an automated approach (self-healing approach) to detecting and correcting build problems during a software build of a software application.

With reference to FIG. 1, in one embodiment, self-healing logic 105 (e.g., a self-healing module) is implemented on the computing device 100 and includes logics for implementing various functional aspects of self-healing logic 105. In one embodiment, self-healing logic 105 includes monitoring logic 110 (e.g., a monitoring module), predictive analysis logic 120 (e.g., a predictive analysis module), knowledge database 130, and remediation logic 140 (e.g., a remediation module).

Other embodiments may provide different logics or combinations of logics that provide the same or similar functionality as self-healing logic 105 of FIG. 1. In one embodiment, self-healing logic 105 is an executable application including algorithms and/or program modules configured to perform the functions of the logics. The application is stored in a non-transitory computer storage medium. That is, in one embodiment, the logics of self-healing logic 105 are implemented as modules of computer-executable instructions stored on a computer-readable medium.

Figure 2:
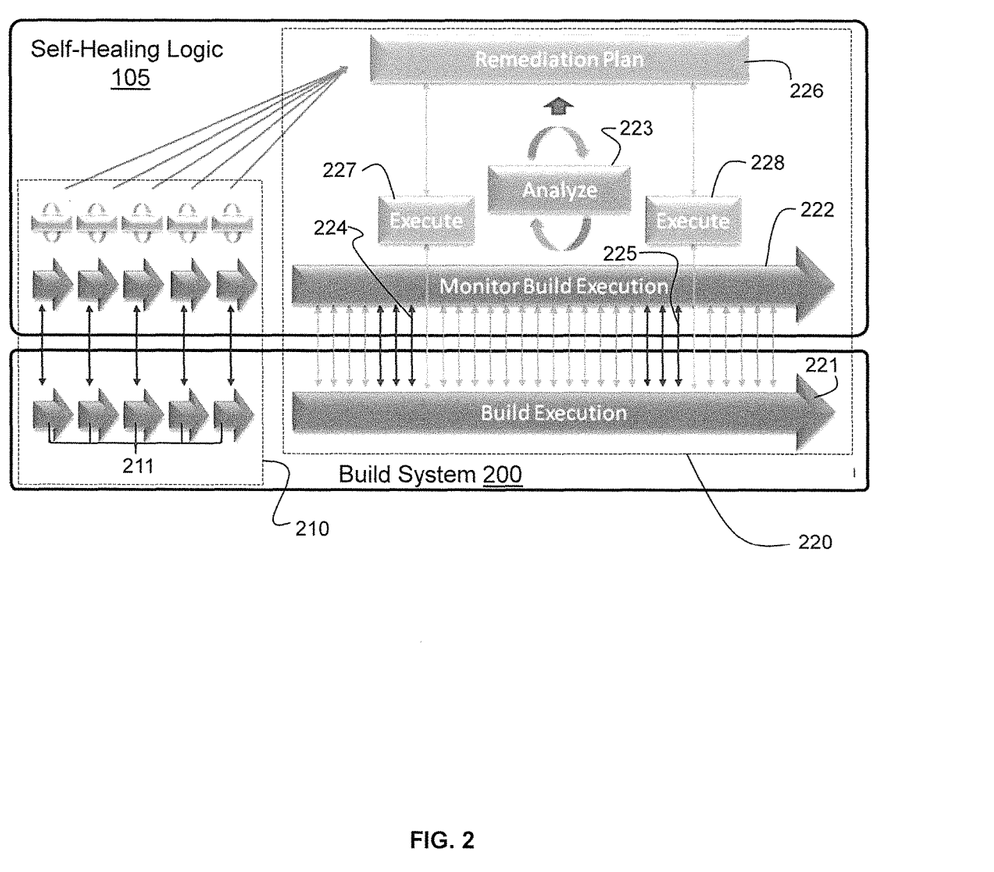
FIG. 2 illustrates a diagram showing how the self-healing logic of FIG. 1 functionally interacts with a build system during execution of a software build of a software application by the build system.

FIG. 2 illustrates a diagram showing how self-healing logic 105 of FIG. 1 functionally interacts with a build system 200 during execution of a software build of a software application by the build system 200. In one embodiment, the build system 200 is a centralized server-side application that executes a build process and that is accessed by many users via computing devices/terminals communicating with the build system 200 (functioning as the server) over a computer network. Multiple computing devices/terminals may be used that allow multiple users (e.g., software developers) to access the build system 200, check-in code, and receive corrective software build services from self-healing logic 105 via networked computer communications.

The left portion 210 of FIG. 2 illustrates the concept that successive software builds 211 occur over time (from left to right). Each software build 211 is executed by the build system 200 and is actively monitored and analyzed by self-healing logic 105. The right portion 220 of FIG. 2 shows what happens when a single software build is executed and progresses in time (from left to right). As the build executes at 221, self-healing logic 105 monitors build data generated by the build at 222 and analyzes the resulting build data at 223 for build patterns that are indicative of build violations. When such build patterns are detected (e.g., at positions 224 and 225 of the build), self-healing logic 105 accesses remediation solutions at 226 and executes the remediation solutions at 227 and 228, for example (i.e., applies the remediation solutions to the software application).

In accordance with one embodiment, for certain instances, remediation solutions may be applied while the build is still being executed by the build system 200. For other instances, the build is first aborted, a remediation solution is applied, and then the build is re-initiated. Whether execution of a build is aborted or not depends on where the build violation was detected (e.g., with respect to what particular software module(s) of the software application) and what portion of the build is currently executing (e.g., a portion of the build that does or does not involve the particular software module(s)).

Referring again to FIG. 1, in accordance with one embodiment, the knowledge database 130 is configured to store and manage data structures (e.g., files or records associated with build processes). For example, in one embodiment, the knowledge database 130 is configured to store build patterns that are correlated to remediation solutions (e.g., each build pattern may be correlated to a separate and distinct remediation solution). Each of the build patterns is related to a build violation that has occurred during prior software builds. Therefore, detection of a build pattern in build data generated during a current software build by a build system 200 is an indication that the corresponding build violation is likely to occur during the current software build.

In one embodiment, monitoring logic 110 is configured to automatically monitor build log data structures (e.g., log files) of build data that are generated during the execution of a current software build of a software application by the build system 200. As a current software build is in progress, monitoring logic 110 samples the build data and passes the build data to predictive analysis logic 120. The amount of build data sampled by monitoring logic 110 can be quite large ("big data"). However, in accordance with one embodiment, monitoring logic 110 samples the build data in a "smart" manner such that build data that is not useful for detecting build violations is not sampled.

In one embodiment, predictive analysis logic 120 is configured to automatically analyze the build data to detect build patterns that can result in build violations, based on build patterns stored in the knowledge database 130. Predictive analysis logic 120 is also configured to automatically match such detected build patterns to remediation solutions stored in the knowledge database 130. Such analyzing and matching is performed by predictive analysis logic 120 using "big data" predictive analysis techniques.

In one embodiment, remediation logic 140 is configured to automatically apply the remediation solutions to the software application. When a remediation solution is automatically applied to the software application, a portion of the source code of the software application is automatically changed or replaced in accordance with the remediation solution. In accordance with one embodiment, remediation logic 140 may apply a remediation solution to the software application without aborting the current software build (i.e., during a current execution of the software build by the build system 200). In accordance with another embodiment, remediation logic 140 may abort the current software build before automatically applying a remediation solution to the software application. In such a scenario, the software build has to be re-initiated after applying the remediation solution.

In one embodiment, once a remediation solution is applied to the software application by remediation logic 140, monitoring logic 110 continues to sample build data as the build is subsequently executed. Furthermore, predictive analysis logic 120 continues to analyze the build data and verifies that the applied remediation solution does not result in a build violation. If a build violation that was to be prevented by the remediation solution does occur, the build may be aborted. In accordance with one embodiment, the build may be aborted by the build system 200 or by self-healing logic 105, depending on the particular circumstances.

Predictive analysis logic 120 also generates remediation statistics derived from the build data generated after a remediation solution is applied to a software application. In one embodiment, the remediation statistics for a remediation solution track the number of times the applied remediation solution is successful (mitigates a build violation). The remediation statistics are stored in the knowledge database 130, in accordance with one embodiment. Once the remediation statistics for a particular remediation solution indicate that a threshold number of successful applications have been reached, the remediation solution can be designated as self-healing and can subsequently be applied automatically without human intervention.

In this manner, remediation solutions that are initially applied manually to a software application can be proven to be robust over time and become self-healing solutions that are applied automatically. Patterns in the build data, detected via predictive analysis techniques during a software build, determine which remediation solutions should be applied. As a result, the performing of software builds becomes more efficient by saving time, energy, and resources. Therefore, carbon emissions emitted by the large infrastructure associated with performing software builds are effectively reduced.

Figure 3:
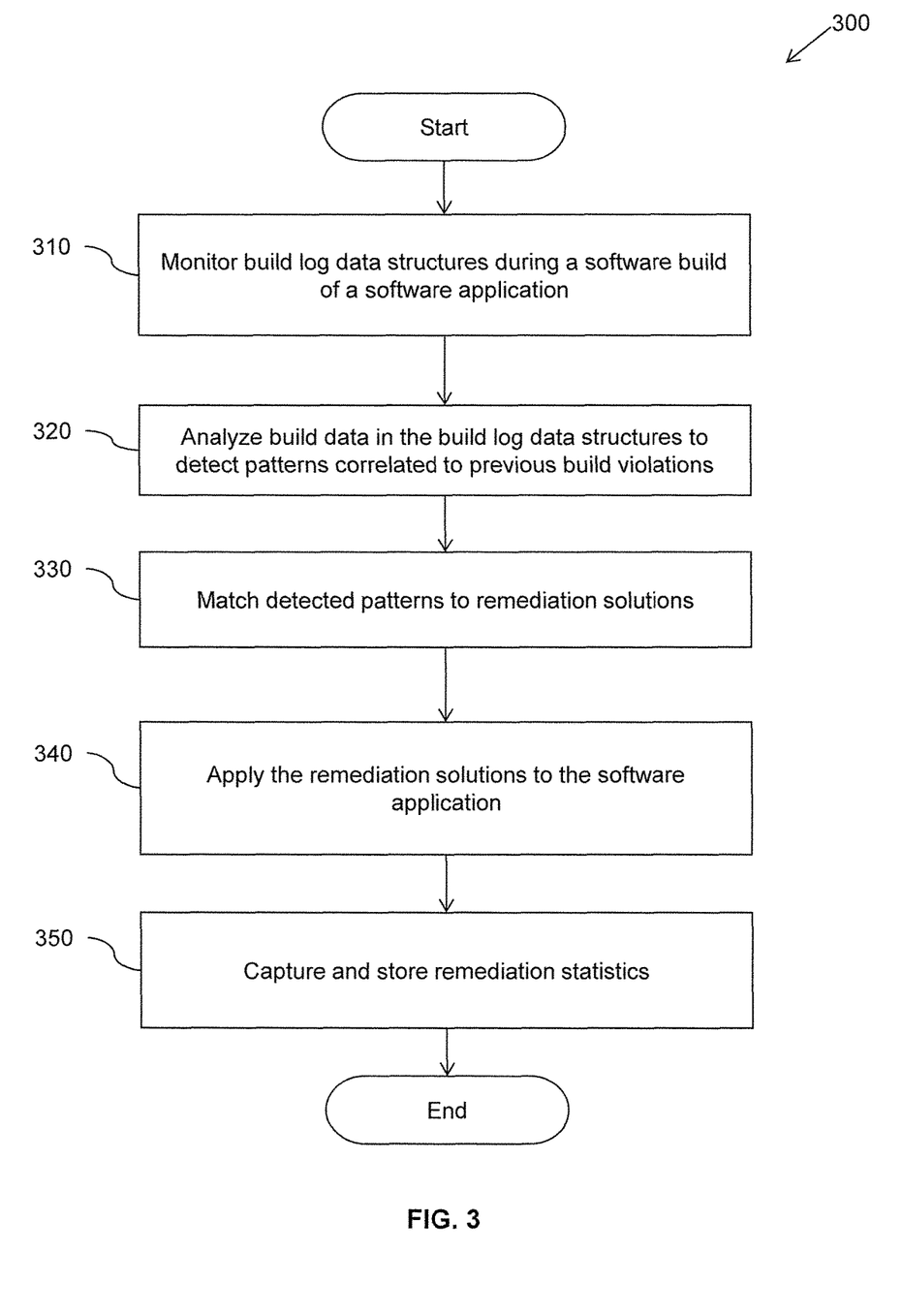
FIG. 3 illustrates one embodiment of a method, which can be performed by the self-healing logic of the computing device of FIG. 1, to provide self-healing solutions to problems that occur during a software build.

FIG. 3 illustrates one embodiment of a method 300, which can be performed by the self-healing logic 105 of the computing device 100 of FIG. 1, to provide self-healing solutions to problems that occur during a software build. Method 300 may be implemented by a computing device configured with algorithms that perform the method 300. For example, in one embodiment, method 300 is implemented by a computing device configured to execute a computer application. The computer application is configured to process data in electronic form and includes stored executable instructions that perform the functions of method 300.

Method 300 will be described from the perspective that patterns in the build data generated by a software build can be indicative of a potential or pending build violation. Again, a build violation may be a build error, a build exception, or a software compliance violation, for example. Remediation solutions to the build violations can be generated and relationships between the indicative patterns and the remediation solutions can be formed and stored in a knowledge database. The knowledge database is dynamic in the sense that the stored relationships can change and grow over time, making the knowledge database more robust. The more robust a knowledge database becomes, the more efficient software builds can become.

Upon initiating method 300, at block 310, build log data structures (e.g., log files) of build data are automatically monitored during execution of a software build of a software application. The build data is generated by a build system 200 during the software build. The build data in the log files is monitored by sampling the build data using "smart", "big data" sampling techniques. For example, in one embodiment, techniques for filtering the build data in the log files are employed based on prior knowledge of what type of build data can and cannot be related to build violations. Monitoring of the build log data structures is accomplished by monitoring logic 110 of self-healing logic 105, in accordance with one embodiment.

At block 320, the build data that is sampled by monitoring logic 110 is automatically analyzed to detect patterns that can result in build violations. The knowledge database 130 stores patterns of build data that have been correlated to build violations that have occurred in the past during previous software builds. In one embodiment, predictive analysis logic 120 uses predictive analysis techniques to detect patterns in the build data, based at least in part on the knowledge database 130, that may result in build violations. For example, as part of the analysis, the build data may be compared to violation data stored in the knowledge database 130 which is associated with previous build violations.

The predictive analysis techniques allow for build violations to be predicted or anticipated before they actually occur during a software build. As a result, a build violation may be prevented from actually occurring during a current or subsequent software build.

At block 330, detected patterns are automatically matched to remediation solutions stored in the knowledge database 130. Some patterns of build data stored in the knowledge database 130 may be similar to each other. However, such patterns, though similar, may be associated with different remediation solutions in the knowledge database 130. Furthermore, a detected pattern may not exactly match a pattern stored in the knowledge database 130.

In one embodiment, predictive analysis logic 120 performs the matching of detected patterns to remediation solutions, taking into account even subtle differences between patterns in the knowledge database 130, and even subtle differences between detected patterns and patterns in the knowledge database 130. Predictive analysis logic 120 uses predictive analysis techniques to distinguish between matching a detected pattern to one remediation solution or another.

However, in the case where a detected pattern cannot be matched to any remediation solution in the knowledge database 130, the current software build may be automatically aborted. In such a case, a new remediation solution may have to be manually generated, added to the knowledge database 130, and be manually applied to the software application.

At block 340, matched remediation solutions are automatically applied to the software application being built. Applying such remediation solutions may include transforming (e.g., modifying and/or replacing) a portion of source code of the software application. In one embodiment, remediation logic 140 automatically applies the remediation solutions to the software application. As discussed previously herein, a remediation solution may be applied without having to abort the software build, in accordance with one embodiment.

A remediation solution can be automatically applied if the remediation solution is designated as a self-healing solution. In one embodiment, when a remediation solution is automatically applied, a notification message providing notification of applying the remediation solution to the software application is generated in a notification data structure. The notification data structure may be automatically sent to a build administrator, for example.

If a remediation solution is not self-healing, then the remediation solution has to first be approved to be applied. Approval may come from, for example, a software developer or a build administrator who is familiar with the remediation solution. For example, in one embodiment, a notification message is generated in a notification data structure. The notification message provides a notification that there is a desire to apply a remediation solution to a software application. The notification data structure is automatically sent to, for example, a software developer or a build administrator for approval.

At block 350, remediation statistics are generated and stored in the knowledge database 130. The remediation statistics are derived from build data generated after a remediation solution is applied to the software application. The remediation statistics include data associated with the success or failure, with respect to preventing build violations, of the remediation solutions. In one embodiment, generation of the remediation statistics is performed by predictive analysis logic 120.

If it is determined that a remediation solution has failed (i.e., a build violation occurred even though the remediation solution was applied), the current software build may be aborted. In such a scenario, manual intervention will commence in an attempt to solve the problem (e.g., a new remediation solution may have to be manually generated and entered in the knowledge database). Such a failure may be automatically reported to a software developer and/or a build administrator, for example.

In this manner, as a software build progresses, build data can be monitored and analyzed to determine if the build is in danger of experiencing a build violation. Corrective action can be taken to avoid the build violation by applying (automatically via self-healing, or manually via human approval) a remediation solution. After applying a remediation solution, monitoring and analysis of the software build can continue to verify that the applied remediation solution is successful.

Figure 4:
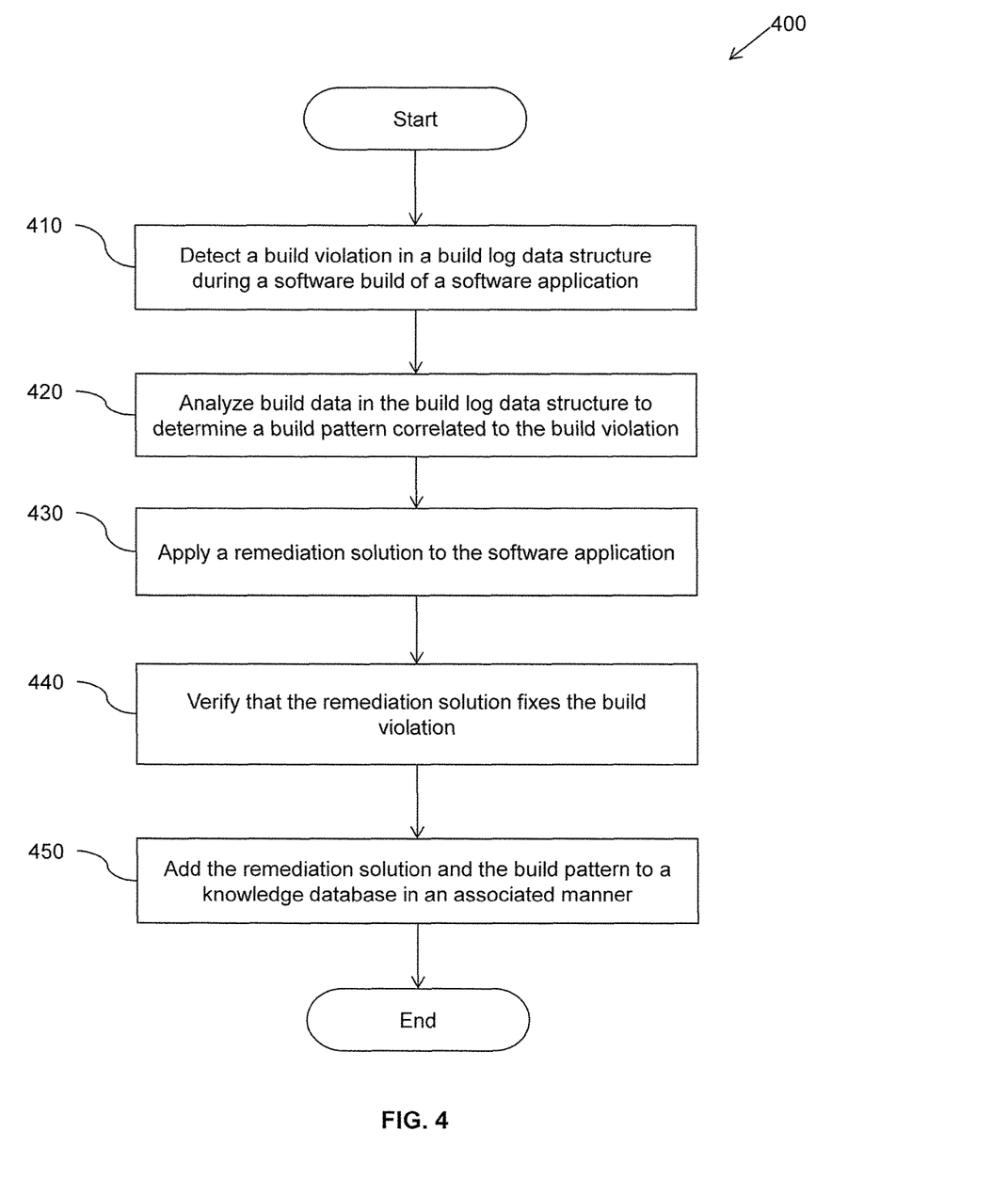
FIG. 4 illustrates one embodiment of a method, which can be performed by the self-healing logic of the computing device of FIG. 1, to build a knowledge database of build patterns and remediation solutions associated with software build problems.

FIG. 4 illustrates one embodiment of a method 400, which can be performed by the self-healing logic 105 of the computing device 100 of FIG. 1, to build a knowledge database 130 of build patterns and remediation solutions associated with software build problems. Method 400 may be implemented by a computing device configured with algorithms that perform the method 400. For example, in one embodiment, method 400 is implemented by a computing device configured to execute a computer application. The computer application is configured to process data in electronic form and includes stored executable instructions that perform the functions of the method 400. Method 400 will be described from the perspective that patterns in the build data generated by a software build can be indicative of a build violation.

Upon initiating method 400, at block 410, a build violation is automatically detected in a build log data structure of build data. The build data is generated during execution of a software build of a software application by a build system 200. Again, a build violation may be a build error, a build exception, or a software compliance violation, for example.

In accordance with one embodiment, the build violation is detected by monitoring logic 110 of self-healing logic 105. In accordance with one embodiment, a current software build is aborted in response to detecting a build violation. A new software build may be initiated subsequent to applying a remediation solution to the software application.

At block 420, the build data is automatically analyzed to determine a build pattern that can be correlated to the build violation. That is, an analysis determines if there is a pattern in the build data leading up to the build violation that is indicative or predictive of the build violation occurring. In one embodiment, the build data is captured by monitoring logic 110 and analyzed for patterns by predictive analysis logic 120.

At block 430, a remediation solution to the build violation is manually applied to the software application. The term "manually applied", as used herein, means that the remediation solution is first approved and then applied, instead of being automatically applied without human intervention as part of a self-healing process. The remediation solution may be developed by a software developer who is familiar with a portion of the code of the software application associated with the build violation. In one embodiment, the remediation solution is applied, upon approval, with the aid of remediation logic 140.

At block 440, verification that the applied remediation solution fixed the build violation is performed. For example, the software build may be re-initiated with the remediation solution in place. In one embodiment, monitoring logic 110 verifies that the same build violation is not detected during a same part of the software build. Furthermore, monitoring logic 110 may verify that the remediation solution has not resulted in any new, unintended build violations.

At block 450, the remediation solution and the correlated build pattern are added to the knowledge database 130 in an associated manner. Therefore, the remediation solution is available to be applied to software applications should the correlated build pattern (or similar build pattern) be detected during a future software build. In one embodiment, the number of times that a particular remediation solution is successfully applied to fix a build violation is tracked over multiple software builds.

The remediation solution is manually applied (i.e., applied upon approval) if the remediation solution is not designated as a self-healing solution. However, when the number of successful applications exceeds a defined threshold value, the remediation solution may be designated as being self-healing. As a result, future applications of the remediation solution to a software application may be performed automatically without human intervention.

In this manner, remediation solutions to build violations can be generated, and relationships between the indicative patterns and the remediation solutions can be formed and stored in a knowledge database. The knowledge database is dynamic in the sense that the stored relationships can change and grow over time, making the knowledge database more robust. The more robust a knowledge database becomes, the more efficient software builds can become.

Systems, methods, and other embodiments have been described that are configured to provide automated detection and correction of potential software build violations. In one embodiment, a knowledge database of build patterns and correlated remediation solutions, that are associated with build violations, is built up over time based on multiple software builds. As the knowledge database becomes more robust, and as remediation solutions are successfully applied multiple times to software applications, software builds become self-healing. That is, appropriate remediation solutions are automatically identified and accessed from the knowledge database, and are automatically applied to software applications as part of the build process. In many instances, a remediation solution is applied before an actual build violation occurs during the execution of a software build, thus avoiding software build disruptions due to actual build violations.

Computing Device Embodiment

Figure 5:
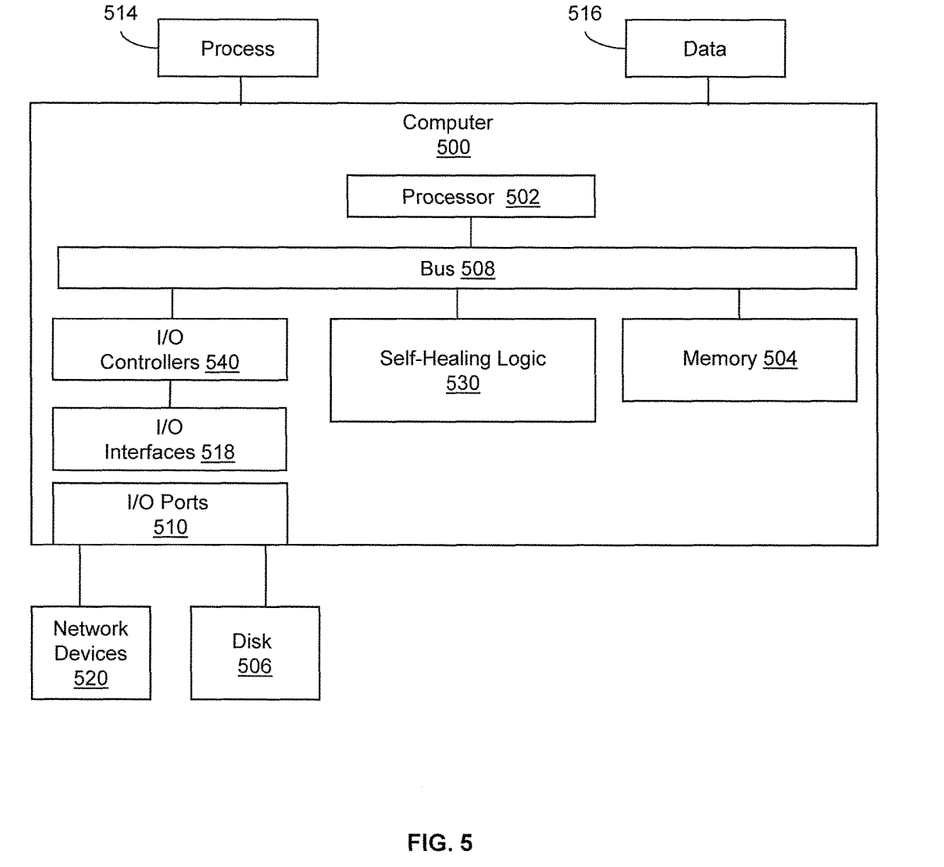
FIG. 5 illustrates one embodiment of a computing device upon which self-healing logic may be implemented.

FIG. 5 illustrates an example computing device that is configured and/or programmed with one or more of the example systems and methods described herein, and/or equivalents. FIG. 5 illustrates one example embodiment of a computing device upon which an embodiment of a self-healing logic may be implemented. The example computing device may be a computer 500 that includes a processor 502, a memory 504, and input/output ports 510 operably connected by a bus 508.

In one example, the computer 500 may include self-healing logic 530 (corresponding to self-healing logic 105 from FIG. 1) configured with a programmed algorithm as disclosed herein to automatically apply self-healing solutions to problems that occur during a software build of a software application. In different examples, the logic 530 may be implemented in hardware, a non-transitory computer-readable medium with stored instructions, firmware, and/or combinations thereof. While the logic 530 is illustrated as a hardware component attached to the bus 508, it is to be appreciated that in other embodiments, the logic 530 could be implemented in the processor 502, a module stored in memory 504, or a module stored in disk 506.

In one embodiment, logic 530 or the computer 500 is a means (e.g., structure: hardware, non-transitory computer-readable medium, firmware) for performing the actions described. In some embodiments, the computing device may be a server operating in a cloud computing system, a server configured in a Software as a Service (SaaS) architecture, a smart phone, laptop, tablet computing device, and so on.

The means may be implemented, for example, as an ASIC programmed to facilitate the automatic remediation of build problems occurring during a software build. The means may also be implemented as stored computer executable instructions that are presented to computer 500 as data 516 that are temporarily stored in memory 504 and then executed by processor 502.

Logic 530 may also provide means (e.g., hardware, non-transitory computer-readable medium that stores executable instructions, firmware) for facilitating the automatic remediation of build problems occurring during a software build.

Generally describing an example configuration of the computer 500, the processor 502 may be a variety of various processors including dual microprocessor and other multi-processor architectures. A memory 504 may include volatile memory and/or non-volatile memory. Non-volatile memory may include, for example, ROM, PROM, and so on. Volatile memory may include, for example, RAM, SRAM, DRAM, and so on.

A storage disk 506 may be operably connected to the computer 500 via, for example, an input/output interface (e.g., card, device) 518 and an input/output port 510. The disk 506 may be, for example, a magnetic disk drive, a solid state disk drive, a floppy disk drive, a tape drive, a Zip drive, a flash memory card, a memory stick, and so on. Furthermore, the disk 506 may be a CD-ROM drive, a CD-R drive, a CD-RW drive, a DVD ROM, and so on. The memory 504 can store a process 514 and/or a data 516, for example. The disk 506 and/or the memory 504 can store an operating system that controls and allocates resources of the computer 500.

The computer 500 may interact with input/output devices via the i/o interfaces 518 and the input/output ports 510. Input/output devices may be, for example, a keyboard, a microphone, a pointing and selection device, cameras, video cards, displays, the disk 506, the network devices 520, and so on. The input/output ports 510 may include, for example, serial ports, parallel ports, and USB ports.

The computer 500 can operate in a network environment and thus may be connected to the network devices 520 via the i/o interfaces 518, and/or the i/o ports 510. Through the network devices 520, the computer 500 may interact with a network. Through the network, the computer 500 may be logically connected to remote computers. Networks with which the computer 500 may interact include, but are not limited to, a LAN, a WAN, and other networks.

Definitions and Other Embodiments

In another embodiment, the described methods and/or their equivalents may be implemented with computer executable instructions. Thus, in one embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on). In one embodiment, a computing device is implemented with one or more executable algorithms that are configured to perform any of the disclosed methods.

In one or more embodiments, the disclosed methods or their equivalents are performed by either: computer hardware configured to perform the method; or computer software embodied in a non-transitory computer-readable medium including an executable algorithm configured to perform the method.

While for purposes of simplicity of explanation, the illustrated methodologies in the figures are shown and described as a series of blocks of an algorithm, it is to be appreciated that the methodologies are not limited by the order of the blocks. Some blocks can occur in different orders and/or concurrently with other blocks from that shown and described. Moreover, less than all the illustrated blocks may be used to implement an example methodology. Blocks may be combined or separated into multiple actions/components. Furthermore, additional and/or alternative methodologies can employ additional actions that are not illustrated in blocks. The methods described herein are limited to statutory subject matter under 35 U.S.C § 101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

ASIC: application specific integrated circuit.
CD: compact disk.
CD-R: CD recordable.
CD-RW: CD rewriteable.
DVD: digital versatile disk and/or digital video disk.
HTTP: hypertext transfer protocol.
LAN: local area network.
RAM: random access memory.
DRAM: dynamic RAM.
SRAM: synchronous RAM.
ROM: read only memory.
PROM: programmable ROM.
EPROM: erasable PROM.
EEPROM: electrically erasable PROM.
USB: universal serial bus.
WAN: wide area network.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). An operable connection may include one entity generating data and storing the data in a memory, and another entity retrieving that data from the memory via, for example, instruction control. Logical and/or physical communication channels can be used to create an operable connection.

A "data structure", as used herein, is an organization of data in a computing system that is stored in a memory, a storage device, or other computerized system. A data structure may be any one of, for example, a data field, a data file, a data array, a data record, a database, a data table, a graph, a tree, a linked list, and so on. A data structure may be formed from and contain many other data structures (e.g., a database includes many data records). Other examples of data structures are possible as well, in accordance with other embodiments.

"Computer-readable medium" or "computer storage medium", as used herein, refers to a non-transitory medium that stores instructions and/or data configured to perform one or more of the disclosed functions when executed. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions. Computer-readable media described herein are limited to statutory subject matter under 35 U.S.C § 101.

"Logic", as used herein, represents a component that is implemented with computer or electrical hardware, a non-transitory medium with stored instructions of an executable application or program module, and/or combinations of these to perform any of the functions or actions as disclosed herein, and/or to cause a function or action from another logic, method, and/or system to be performed as disclosed herein. Equivalent logic may include firmware, a microprocessor programmed with an algorithm, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. For example, if greater speed is a consideration, then hardware would be selected to implement functions. If a lower cost is a consideration, then stored instructions/executable application would be selected to implement the functions. Logic is limited to statutory subject matter under 35 U.S.C. § 101.

"User", as used herein, includes but is not limited to one or more persons, computers or other devices, or combinations of these.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. § 101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

To the extent that the phrase "one or more of, A, B, and C" is used herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be used.

What is claimed is:

1. A method for providing automated detection and correction of software build violations executed by at least a hardware processor of a computing device, the method comprising:
   storing, by at least the hardware processor, a plurality of build patterns correlated to a plurality of remediation solutions in a knowledge database, stored in a memory, wherein the plurality of build patterns are related to a plurality of build violations that have occurred during prior software builds;
   monitoring, by at least the hardware processor, at least one build log data structure, stored in the memory, of build data generated during an execution of a software build of a software application, that converts source code into complied binary code during a first compilation;
   analyzing, by at least the hardware processor executing stored instructions, the build data in the memory against a set of known patterns to identify known patterns within the build data that can result in build violations associated with the converting of the source code into the complied binary code, wherein the identified known patterns are identified during the first compilation of the source code into the complied binary code, wherein an identified known pattern is an indicator of a potential future build violation;
   identifying, by at least the hardware processor, at least one remediation solution assigned within the knowledge database to the identified known patterns; and
   transforming, by at least the hardware processor, the software application by automatically applying the at least one remediation solution to modify code of the software application to eliminate the potential future build violation to avoid aborting the software build of the first compilation, wherein the transforming comprises applying the at least one remediation solution to the source code at build time during the first compilation before occurrence of the potential future build violation; and
   wherein the transforming performs automated detection and correction of the software build violations during the first compilation before occurrence of the potential future build violation to improve a build cycle time of the software build and reduce computing resource consumption used for the software build.

2. The method of claim 1, wherein the analyzing includes applying predictive analysis techniques to the build data.

3. The method of claim 1, further comprising generating remediation statistics and storing the remediation statistics in the knowledge database, wherein the remediation statistics are derived from build data generated after the at least one remediation solution is applied to the software application.

4. The method of claim 1, further comprising matching patterns in the build data to the set of known patterns to identify matching patterns.

5. The method of claim 1, further comprising automatically aborting the execution of the software build when the at least one remediation solution fails.

6. The method of claim 1, wherein the analyzing includes comparing the build data to violation data stored in the knowledge database which is associated with previous build violations.

7. The method of claim 1, further comprising automatically aborting the execution of the software build when at least one of the patterns detected by the analyzing does not match to a remediation solution in the knowledge database that is eligible to be automatically applied.

8. The method of claim 1, further comprising generating a notification message in a notification data structure, wherein the notification message provides a notification of applying the at least one remediation solution to the software application, and wherein the notification data structure is configured to be automatically sent to at least one software developer associated with the software application.

9. The method of claim 1, further comprising automatically applying the at least one remediation solution to the software application without aborting the software build.

10. A computing system for providing automated detection and correction of software build violations the computing system comprising:
    a knowledge database, stored in a memory, storing a plurality of build patterns correlated to a plurality of remediation solutions, wherein the plurality of build patterns are related to a plurality of build violations that have occurred during prior software builds;
    a monitoring module, including instructions stored in a non-transitory computer-readable medium and executable by a hardware processor, is configured to monitor at least one build log data structure, stored in the memory, of build data generated during execution of a current software build, of a software application, that converts source code into complied binary code during a first compilation;
    a predictive analysis module, including instructions stored in the non-transitory computer-readable medium and executable by the hardware processor, is configured to:
       (i) analyze the build data in the memory against a set of known patterns to identify known patterns within the build data that can result in build violations associated with the converting of the source code into the complied binary code, wherein the identified known patterns are identified during the first compilation of the source code into the complied binary code, wherein an identified known pattern is an indicator of a potential future build violation, and
       (ii) identify at least one remediation solution assigned within the knowledge database to the identified known patterns; and
    a remediation module, including instructions stored in the non-transitory computer-readable medium and executable by the hardware processor is configured to transform the software application by automatically applying the at least one remediation solution to modify code of the software application to eliminate the at least one potential future build violation to avoid aborting the software build of the first compilation, wherein the transforming comprises applying the at least one remediation solution to the source code at build time during the first compilation before occurrence of the potential future build violation, and
    wherein the transforming performs automated detection and correction of the software build violations during the first compilation before occurrence of the potential future build violation to improve a build cycle time of the software build and reduce computing resource consumption used for the software build.

11. The computing system of claim 10, wherein the predictive analysis module is configured to automatically analyze the build data, subsequent to the remediation module applying the at least one remediation solution to the software application, to verify that the at least one remediation solution does not result in a build violation.

12. The computing system of claim 10, wherein the remediation module is configured to automatically apply the at least one remediation solution to the software application without aborting the current software build.

13. The computing system of claim 10, wherein the remediation module is configured to abort the current software build before automatically applying the at least one remediation solution to the software application.

14. The computing system of claim 10, wherein the predictive analysis module is configured to generate remediation statistics derived from build data generated after at least one remediation solution is applied to the software application.

15. The computing system of claim 14, wherein the knowledge database is configured to store the remediation statistics generated by the predictive analysis module.

16. A non-transitory computer-readable medium storing computer-executable instructions that, when executed by a hardware processor of a computing device, cause the hardware processor of the computing device to perform functions, wherein the instructions comprise instructions for:

storing, by at least the hardware processor, a plurality of build patterns correlated to a plurality of remediation solutions in a knowledge database, stored in a memory, wherein the plurality of build patterns are related to a plurality of build violations that have occurred during prior software builds;

monitoring, by at least the hardware processor, at least one build log data structure, stored in the memory, of build data generated during an execution of a software build of a software application, that converts source code into complied binary code during a first compilation;

analyzing the build data in the memory against a set of known patterns to identify known patterns within the build data that can result in build violations associated with the converting of the source code into the complied binary code, wherein the identified known patterns are identified during the first compilation of the source code into the complied binary code, wherein an identified known pattern is an indicator of a potential future build violation;

identifying at least one remediation solution assigned within the knowledge database to the identified known patterns;

transforming the software application by automatically applying the at least one remediation solution to modify code of the software application to eliminate the potential future build violation to avoid aborting the software build of the first compilation, wherein the transforming comprises applying the at least one remediation solution to the source code at build time during the first compilation before occurrence of the potential future build violation, and wherein the transforming performs automated detection and correction of software build violations during the first compilation before occurrence of the potential future build violation to improve a build cycle time of the software build and reduce computing resource consumption used for the software build; and verifying that the remediation solution eliminates the build violation.

17. The non-transitory computer-readable medium of claim 16, wherein the instructions further include instructions for adding a remediation solution and a build pattern for which the remediation solution was applied to the knowledge database, wherein the build pattern is associated with the remediation solution in the knowledge database.

18. The non-transitory computer-readable medium of claim 16, wherein the instructions further include instructions for:

tracking a number of times a remediation solution is applied to the software application and eliminates a build violation over a plurality of software builds; and designating the remediation solution to be automatically applied to the software application when the number of times exceeds a defined threshold value.

19. The non-transitory computer-readable medium of claim 16, wherein the instructions further include instructions for aborting the software build in response to detecting an occurrence of the potential future build violation.

20. The non-transitory computer-readable medium of claim 16, wherein the instructions further include instructions for initiating a new software build subsequent to applying at least one remediation solution to the software application.

* * * * *

UNITED STATES PATENT AND TRADEMARK OFFICE
CERTIFICATE OF CORRECTION

PATENT NO. : 10,073,683 B2
APPLICATION NO. : 14/841827
DATED : September 11, 2018
INVENTOR(S) : Prasad et al.

Page 1 of 1

It is certified that error appears in the above-identified patent and that said Letters Patent is hereby corrected as shown below:

In the Claims

In Column 14, Line 17, in Claim 10, delete "violations" and insert -- violations, --, therefor.

In Column 14, Line 49, in Claim 10, delete "processor" and insert -- processor, --, therefor.

Signed and Sealed this
Second Day of March, 2021

Drew Hirshfeld
*Performing the Functions and Duties of the*
*Under Secretary of Commerce for Intellectual Property and*
*Director of the United States Patent and Trademark Office*